Jan. 27, 1970 W. H. CROWELL 3,492,471

TIME DIVISION MULTIPLIER

Filed Oct. 16, 1967

2 Sheets-Sheet 1

INVENTOR.
WILLIAM H. CROWELL

BY
G. Donald Weber Jr.
ATTORNEY.

INVENTOR.
WILLIAM H. CROWELL
BY
G. Donald Weber Jr.
ATTORNEY.

United States Patent Office 3,492,471

Patented Jan. 27, 1970

3,492,471

TIME DIVISION MULTIPLIER

William H. Crowell, Lansdale, Pa., assignor to Honeywell Inc., Minneapolis, Minn., a corporation of Delaware Filed Oct. 16, 1967, Ser. No. 675,596

Int. Cl. G06g 7/16, 7/20

U.S. Cl. 235—194 10 Claims

ABSTRACT OF THE DISCLOSURE

The subject arithmetic circuit includes a plurality of operational amplifiers interconnected to operate upon a plurality of input signals to selectively produce output signals indicative of the multiplication of the input signals or the square root of the product thereof.

This invention relates to a time division multiplier circuit which may be utilized in many computational environments. The subject circuit produces improved operation over circuits known in the art. Typical of the known circuits is the apparatus described in the copending application of T. A. Patchel, entitled Electrical Apparatus, bearing Ser. No. 406,675, filed on Oct. 27, 1964, now Patent No. 3,383,501 and assigned to the common assignee.

In the past, analog multiplier and divider circuits have been used in computing equipment or a computational environment. The well known circuits of this type, in the past, used a logarithmic function-generator multiplication technique. This type of technique is disadvantageous inasmuch as a large number of logarithmic function-generators were required thereby necessitating a large amount of space and cost. In addition, the logarithmic multiplier technique has certain inherent limitations in the accuracy thereof.

The subject invention utilizes standard operational amplifiers as the active components thereof. These amplifiers may be fabricated according to standard integenerally, a pair of channels. A first channel includes an integrating amplifier, an inverting amplifier for compensation and a comparator circuit for control purposes. A second channel includes an integrating amplifier and a memory or sample and hold amplifier. The first and second channels may be interconnected to selectively produce a desired arithmetic function. In addition, compensating networks and switching networks are included. The compensating networks effectively eliminate the effect of certain offset voltages and the like while the switching circuit, controlled by the circuitry of the first channel, controls the interaction and interconnection of the various amplifiers.

Thus, one object of this invention is to provide an improved arithmetic circuit.

Another object of this invention is to provide an improved arithmetic circuit which has a relatively high degree of accuracy.

Another object of this invention is to provide an arithmetic circuit of the time division multiplier type.

Another object of this invention is to provide a time division multiplier circuit which is relatively low in cost.

These and other objects and advantages of the invention will become more readily apparent when the following description is read in conjunction with the accompanying drawings, in which.

Figure 1:
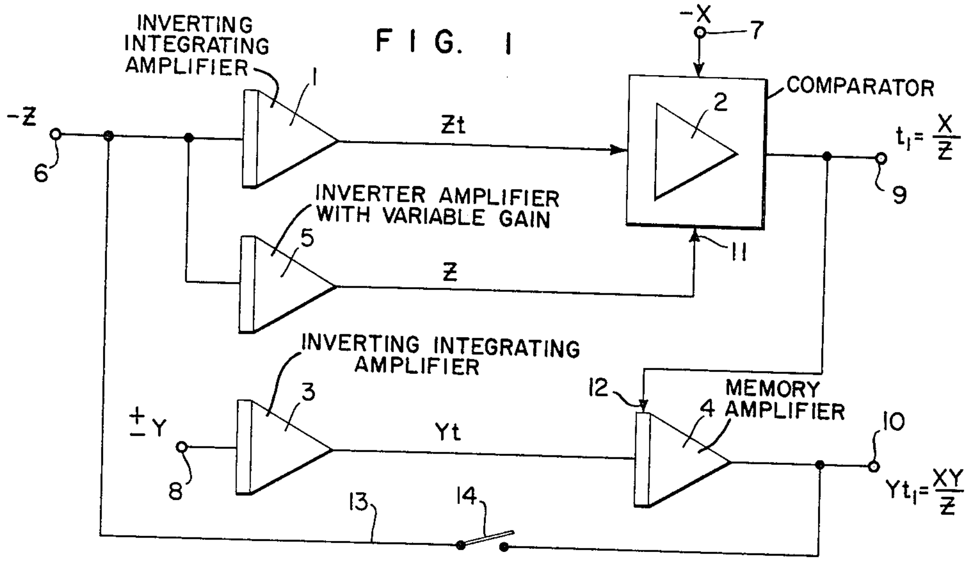
FIGURE 1 is a block diagram of the circuit.

Referring now to FIGURE 1, there is shown a block diagram of the subject invention. In FIGURE 1, input terminal 6 to which a signal, for example $-Z$, is applied is connected to one input of amplifiers 1 and 5. Amplifier 1 is an inverting, integrating amplifier while amplifier 5 is an inverter with variable gain. Thus, the output signal produced by amplifier 1 is $Zt$ while amplifier 5 produces signal G5Z where G5 is the gain of amplifier 5. The outputs of amplifiers 1 and 5 are connected to comparator 2. A second input terminal 7 is utilized to supply a signal $-X$ to comparator 2. Ideally comparator 2 is operative to produce a signal when the combination of the signal supplied from amplifier 1, namely $Zt$, and the signal supplied by amplifier 5, namely G5Z, is equal to the signal supplied at input terminal 7, namely X. Thus, the output signal detected at output terminal 9 is $t1=X/Z$. As will appear hereinafter, the signal G5Z applied at terminal 11 of comparator 2 by amplifier 5 is used for compensation purposes. The signal Z may have a value of zero.

A third input terminal 8 is connected to the input of inverting, integrating amplifier 3. The input signal $+Y$ is applied at terminal 8. The output signal produced by amplifier 3 is $Yt$ and is applied to an input of memory amplifier 4. An input terminal 12 of amplifier 4 is connected to the output of comparator 2. Thus, amplifier 4 is selectively enabled to receive the output signal from amplifier 3. The signal supplied at output terminal 10 by amplifier 4 is a function of the instantaneous value of the input signal Y as related to the $X/Z$ signal produced by the first channel. Thus, the signal at output terminal 10 is $Yt_1=XY/Z$.

Output terminal 10 is selectively connected to input terminal 6 via conductor 13 and switch 14. When switch 14 is open, as shown, the signal supplied at output terminal 10 is as noted supra. When switch 14 is closed, the aforesaid output signal is supplied at the input terminal 6 whereby the signal $XY/Z$ becomes the Z input. By rearranging the equation, it is apparent that $XY=Z^2$ or $Z=\sqrt{XY}$. Consequently, when output terminal 10 is connected to input terminal 6, the circuit shown in FIGURE 1 operates as a square root extractor.

Figure 2:
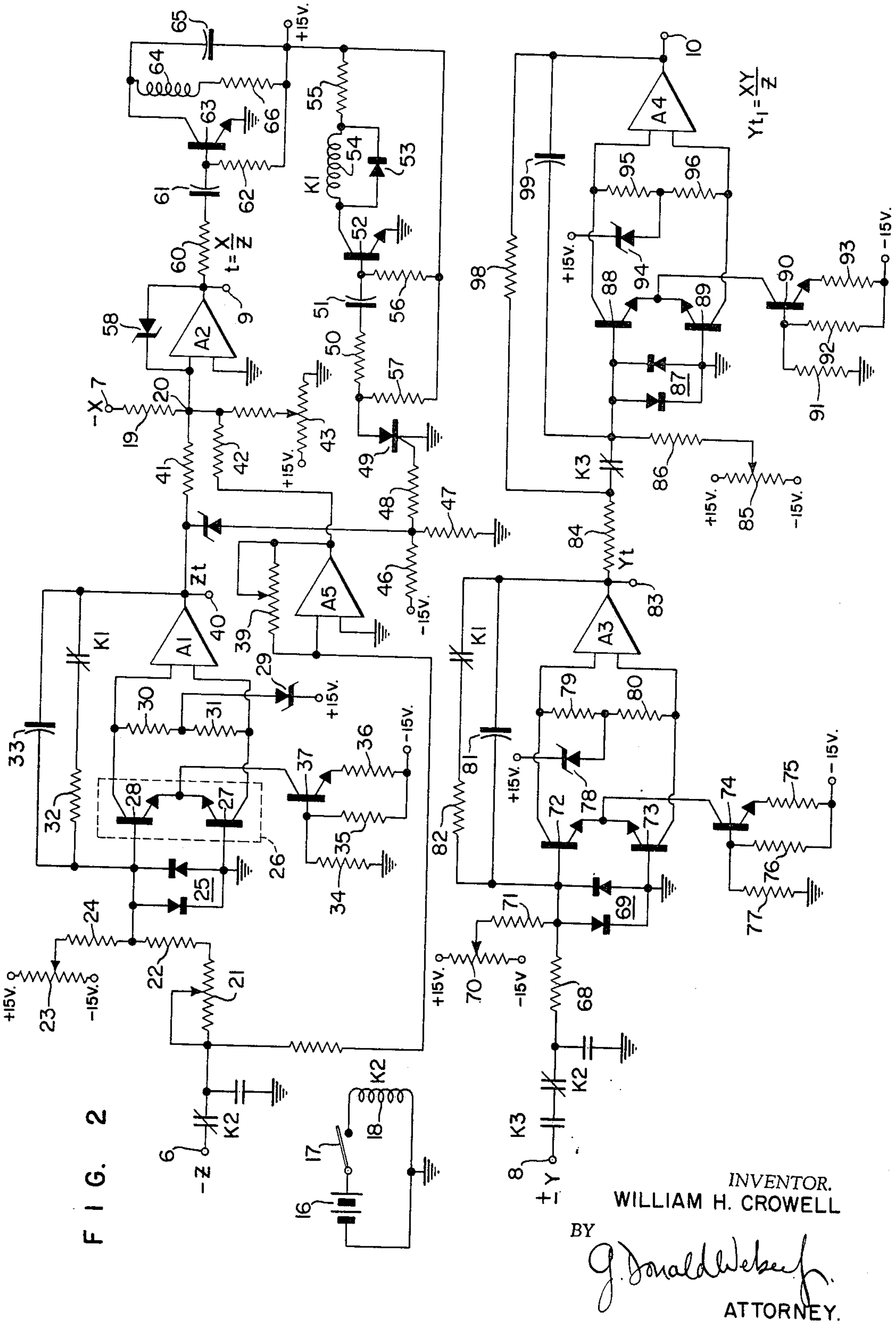
FIGURE 2 is a schematic diagram of one embodiment of the invention.

Referring now to FIGURE 2, there is shown a more detailed schematic diagram of one embodiment of the instant invention. In FIGURE 2, the input terminal 6 is that terminal to which the $-Z$ input signal is supplied. Input terminal 6 is connected via one set of contacts of relay K2 to a second set of contacts of relay K2. The second set of contacts is connected to a suitable reference potential, for example, ground. The first set of contacts is closed, as shown, when relay K2 is deenergized while the second set of contacts is open when relay K2 is deenergized. The common junction between the two sets of relay contacts is connected to one terminal of variable resistor 21 which is connected in series with resistor 22. Resistor 22 is further connected to a summing junction along with one terminal of resistor 24. The free end of resistor 24 is connected to the variable tap of variable resistor 23 which is connected between suitable voltage supplies, for example a +15 volt source and a −15 volt source. An offset voltage compensating signal is supplied across resistor 23. The common junction, i.e. summing junction, between resistors 22 and 24 is connected to the base of NPN transistor 28. The base of NPN transistor 27 is connected to ground. Diode clamping network 25 is connected between the base of the transistors. Thus, the diodes are connected in opposite polarities in order to prevent excessive potential signals at the base of either the transistors especially during switching transients. The emitter of transistors 27 and 28 are connected together and to the collector of transistor 37. The emitter of transistor 37 is connected to a −15 volt source via resistor 36. The base of transistor 37 is connected to ground via resistor 34 and to the −15 volt source via resistor 35. This network provides a substantially constant current to transistors 27 and 28.

Transistors 27 and 28 may be fabricated in accordance with integrated circuit techniques as indicated by the dashed line 26. This type of circuit configuration can be connected in such a manner that the temperature of the entire component is held at a predetermined level wherein ambient temperature variations are rendered insignificant on the operation and stability of the device.

The collectors of transistors 27 and 28 are connected to inputs of amplifier A1. A voltage divider network comprising resistors 30 and 31 is connected between the inputs of amplifier A1. The common connection between resistors 30 and 31 is connected via Zener diode 29 to a +15 volt source. The output of amplifier A1 is connected to terminal 40 at which the output signal $Zt$ is detected. In addition, the capacitor 33 is connected between the output terminal 40 and the base of transistor 28. Resistor 32 and one set of contacts of relay K1 are connected in series with each other and in parallel with capacitor 33. The output terminal 40 is further connected via resistor 41 to summing junction 20 via resistor 41. Summing junction 20 is one input of amplifier A2.

The second input terminal 7 to which the input signal −X is supplied is connected, via resistor 19 to the summing junction 20. Also connected to summing junction 20 is one end of resistor 44. Another end of resistor 44 is connected to the variable tap of variable resistor 43 which is connected between a +15 volt source and ground.

The common junction between the sets of contacts K2, noted supra, is further connected via resistor 38 to one input to amplifier A5. The other input of amplifier A5 is connected to ground such that this amplifier produces an inverting function. The output of amplifier A5 is connected to the first mentioned input thereof via variable resistor 39. Variable resistor 39 is utilized to vary the gain of amplifier A5. In a preferred embodiment, the gain of amplifier A5 varies between 0 and 0.2 as resistor 39 is varied from a short circuited to a fully resistive condition. The output of amplifier A5 is further connected via resistor 42 to the summing junction 20.

The summing junction as noted supra, is one input of amplifier A2. The second input of amplifier A2 is connected to ground. The output of amplifier A2 is connected to the first named input thereof via Zener diode 58. Thus, amplifier A2 operates as a voltage comparator and produces a signal indication when the signal applied at summing junction 20 is equal to the ground signal applied at the second input thereof. In addition, this condition is satisfied when the signal supplied via resistor 41, 42 and 44 are equal and opposite to the signal supplied via the resistor 19. Typically, amplifier A2 produces a slightly positive signal, for example on the order of +1 volt, in the absence of a comparison between the input signals applied thereto. When the input signals are equal, amplifier A2 switches and provides a negative signal on the order of −7 volts.

The output of amplifier A2 is connected to terminal 9 at which the output signal $t1=X/Z$ is detected. In addition, the output of amplifier A2 is connected via resistor 60 and capacitor 61 to the base of NPN transistor 63. The emitter of transistor 63 is connected to ground. The base of transistor 63 is connected via resistor 62 to the +15 volt source. The collector of transistor 63 is connected via capacitor 65 to the +15 volt source. In addition, the coil 64 of relay K3 is connected in series with resistor 66 which series network is connected in parallel with capacitor 65.

Thus, it is seen that in the absence of a comparison by amplifier A2, a positive signal is applied at the base of transistor 63 thereby causing conduction in the transistor. Conduction in transistor 63 causes conduction through coil 64 thereby energizing relay K3. The significance of this energization will become readily apparent hereinafter. The converse situation applies when the input signals applied at amplifier A2 are identical and produce a negative output signal. Thus, a negative signal is provided by the differentiating network comprising resistor 60 and capacitor 61 such that a "spike" signal is applied to the base of transistor 63. The negative spike which has a duration of approximately 1 milliseconds renders transistor 63 nonconductive wherein the current through coil 64 is terminated. Thus, relay K3 is deenergized upon the application of identical signals to summing junction 20.

The output terminal of amplifier A1 is further connected to a −15 volt source via Zener diode 45 and the resistor 46 connected in series therewith. Zener diode 45 is arranged with the cathode thereof connected at the output terminal of amplifier A1. The common junction between the anode of diode 45 and resistor 46 is connected via resistor 47 to ground. The common junction of resistors 46 and 47 is connected via resistor 48 to the trigger electrode of semiconductor switch 49. The cathode of SCS 49 is connected to ground while the anode thereof is connected to the +15 volt source via resistor 57. In addition, the anode of SCS 49 is connected via the differentiating network comprising resistor 50 and capacitor 51 to the base of NPN transistor 52. The base of transistor 52 is further connected to a +15 volt source via resistor 56. The emitter of transistor 52 is connected directly to ground. The collector of transistor 52 is connected to the +15 volt source via the series combination of coil 54 of relay K1 and resistor 55. Diode 53 is connected in parallel with coil 54.

Typically, a relatively low voltage signal is applied at the cathode of Zener diode 45 whereby this diode is nonconductive. Consequently, a potential of approximately −0.3 volt exists at the anode thereof. This potential is supplied to the trigger terminal of SCS 49. Thus SCS 49 is turned off whereby a relatively positive signal on the order of +0.6 volt is supplied at the base of transistor 52. Thus, transistor 52 is conductive whereby current flow exists from the +15 volt source through resistor 55 and coil 54 to ground. With current flow through coil 54, relay K1 is energized. The significance of this energization will be described hereinafter.

Ultimately, the signal supplied by amplifier A1 will achieve a level which is sufficient to cause a reverse conduction through Zener diode 45. This reverse conduction through diode 45 causes current flow through resistor 47 to ground such that a relatively positive potential appears at the anode of Zener diode 45. This relatively positive potential is supplied to the gate terminal at SCS 49 rendering SCS 49 conductive. When SCS 49 is conductive, the anode thereof is, effectively, switched to ground potential (plus the voltage drop thereacross). Thus, the potential at the base of transistor 52 is a relatively negative going spike inasmuch as the negative going signal at the anode of SCS 49 is differentiated by the circuit comprising resistor 50 and capacitor 51. This differentiated signal has a duration of approximately 3 milliseconds during which transistor 52 is rendered nonconductive. When transistor 52 is nonconductive, current flow ceases in coil 54 whereby relay K1 is deenergized.

The third input terminal 8 is connected to one set of contacts of relay K3. A pair of sets of contacts of relay K2 are connected between ground and the contacts of relay K3. The common junction between the sets of contacts of relay K2 are connected via resistor 68 to the base of NPN transistor 72. The base of NPN transistor 73 is connected to ground. A diode clamp 69 is connected between the bases of transistors 72 and 73. Again, transistors 72 and 73 may be constructed by suitable integrated circuitry techniques to provide a temperature controlling feature whereby ambient temperature variations are avoided.

Transistor 74 has the emitter thereof connected to the −15 volt source via resistor 75. The base of transistor 74 is connected via resistor 76 to the −15 volt source and, via resistor 7, to ground. The collector of transistor 74 is connected to the emitters of transistors 72 and 73 to provide a common substantially constant current source therefor. The collectors of transistors 72 and 73 are connected to separate inputs of amplifier A3. A voltage divider network comprising resistors 79 and 80 is connected across the input terminals of amplifier A3. The common junction of resistors 79 and 80 is connected via Zener diode 78 to a +15 volt source. The output of amplifier A3 is connected to output terminal 83. Capacitor 81 is connected between the output terminal of amplifier 83 and the base of transistor 72. A series network comprising resistor 82 and one set of contacts of relay K1 are connected in parallel with capacitor 81.

Resistor 70 is connected between a +15 and a −15 volt source. The variable tap of resistor 70 is connected via resistor 71 to the base of transistor 72. Again, this network provides a compensation network wherein the offset voltage of the transistor circuitry is compensated.

The output terminal 83 is utilized to detect the output signal $Yt$. In addition, output terminal 83 is connected via resistor 84 to one set of contacts of relay K3. The contacts of relay K3 are connected to the base of transistor 88. The base of transistor 89 is connected to ground. Again, a diode clamp 87 is connected between the bases of transistors 88 and 89 to provide protection against excessive voltages which may be inadvertently applied thereto. Furthermore, transistors 88 and 89 may be formed in a typical integrated circuitry package such as the package 26 noted supra.

The offset voltage compensating network comprising variable resistor 85 connected between the +15 and −15 volt sources is provided. The variable tap of resistor 85 is connected to the base of transistor 88 via resistor 86. The constant current network comprising transistor 90 and the bias resistors 91, 92 and 93 is provided. Resistors 91 and 92 are connected between the base of transistor 90 and ground and −15 volt source, respectively. Resistor 93 is connected between the emitter and the −15 volt source. The collector is connected directly to the emitters of transistors 88 and 89. The collectors of transistors 88 and 89 are connected to separate inputs of amplifier 84. A voltage divider network comprising resistors 95 and 96 is connected between the inputs of amplifier A4. The common junction between resistors 95 and 96 is connected to a +15 volt source via Zener diode 94. The output of amplifier 84 is conected to terminal 10 at which the signal $Yt_1=XY/Z$ is detected. In addition, the output terminal 10 is connected, via capacitor 99, to the base of transistor 88. A resistor 98 is connected between the output terminal 10 and the common junction between resistor 84 and the associated contacts of relay K3.

In operation, input signals are applied at terminals 6, 7 and 8. It will be noted, that the input signals at terminals 6 and 7 must have the same sign or polarity. Thus, when the signal supplied at terminal 6 is −Z, the signal supplied at terminal 7 must be −X. The signal at input terminal 8 is somewhat dependent upon the mode of operation. For example, if the circuit is connected in square root mode, i.e. switch 14 (FIGURE 1) is closed, the sign or polarity of the Y signal must be the same as the sign of the X signal. However, in the division mode, i.e. switch 14 is open, the Y signal may have either polarity when applied at terminal 8.

For balancing purposes, a switch 17 is closed whereby a battery 16 is connected in series with coil 18 of relay K2. This circuit is a schematic representation only and does not limit the operation. When switch 17 is closed and current flows in coil 18 of relay K2, the contact set shown connected adjacent terminals 6 and 8 operates such that the condition of the contacts is changed. For example, those contacts indicated to be closed are switched to the open condition while the contacts shown open are switched to the closed position. Thus, the base of transistor 28 is connected via resistors 22 and 21 to ground through the now closed set of contacts of relay K2. In addition, the input terminal 6 is disconnected from the circuits by the now open contacts of relay K2. A similar condition exists in the second channel of the circuit wherein terminal 8 is disconnected via the now open contacts of relay K2 while the base of transistor 72 is connected via resistor 68 and the now closed contacts of relay K2 to ground. This operation permits balancing of the circuitry. During balancing, variable resistors 23, 70 and 85 are adjusted to eliminate or counterbalance the offset voltage of the transistor circuitry. Typically, the offset voltage of the transistor package is slightly positive such that the potential at the variable tap of resistors 23, 70 and 85 will be slightly negative. However, a bipolar adjustment is permitted, if necessary. In effect, this adjustment eliminates an inappropriate integration process by the amplifier in the absence of an actual input signal.

After the balance operation is complete, the calibration operation is performed. That is, switch 17 is opened whereby current flow in coil 18 of relay K2 is terminated. The sets of contacts K2 associated with input terminals 6 and 8 returned to the conditions as shown. Thus, the input signal −Z is now applied to the base of transistor 28 of the differential pair. The differential amplifier pair provides signals through the input of amplifier A1. With the resistance divider network comprising resistors 30 and 31, a differential gain of 20 is provided.

While in the calibrating condition, variable resistor 39 may be adjusted to effect the necessary gain function of amplifier A5. As noted, this amplification factor (G5) may vary between 0 and 0.2. This gain function is provided to offset the delays in the switching network comprising transistor 63 and the associated components. Thus, if little or no delay is experienced, the gain factor would be set to zero. On the contrary, as the delay increases, the gain function of amplifier A5 would be increased towards the 0.2 maximum figure. The gain function of amplifier A5 is also related to the operation of amplifier A3 and input signal supplied thereto. For example, if the input signal applied to amplifier A3 is a small, constant, signal, the problems caused by the delay of transistor 63 and the associated switching circuitry will be reduced. Consequently, under these circumstances, the gain function again may be set to zero. This information will be readily available wherein a suitable adjustment of variable resistor 39 can be made.

In addition, variable resistor 43 is adjusted during the calibration operation. The signal supplied by resistor 43 compensates for the rise time function of comparator A2. Thus, it is seen that the compensation signals applied via amplifier A5 and resistor 43 are effective to offset delays which may be experienced due to a rise time of amplifier A2 and the switching circuitry including transistor 63. The compensation signals are in the form of voltages which are applied to the summing junction along with the output of amplifier A1 and are combined with the input signal −X. Thus, the compensation signals will effectively cause comparator A2 to detect a "comparison" at a time period prior to the actual production of a signal by amplifier A1. Of course, if the delayed problems are eliminated, the compensation signals supplied to junction 20 are also eliminated.

After calibration, the actual operation begins. Thus, amplifier A1, when connected as an integrator, begins to produce a ramp output signal which varies from substantially 0 volts in a ramp output waveform. It should be noted that the contacts K1 connected across amplifier A1 are open inasmuch as transistor 52 is conductive and current flow through coil 54 or relay K1 exists. Since the contacts, as shown, represent the deenergized condition, energization of coil 54 renders the contacts K1 open. Consequently, the capacitor 33 is connected across amplifier A1 whereby integration operation is achieved.

The ramp signal supplied at the output terminal of amplifier A1 is applied to summing junction 20 via resistor 41. The compensation voltages applied via resistors 42 and 44 have already been discussed. The ramp signal and the compensation signals, if any, are summed with the input signal supplied at terminal 7. As noted, so long as the sum of these signals does not equal 0, amplifier A2 does not detect a comparison and the output signal supplied thereby is a slightly positive signal. When the magnitude of the ramp signal Z*t* (along with any compensating signals) equals the magnitude of the X signal at terminal 7, the sum of the signals at the junction 20 equals 0. Comparator A2 detects a comparison and produces a negative signal. This negative going signal is differentiated and applied to the base of transistor 63 thereby disabling this transistor.

When transistor 63 is nonconductive, current flow through coil 64 of relay K3 ceases and this relay is deenergized. When relay K3 is deenergized, the separate sets of contacts K3 associated with input terminal 8 and the base of transistor 88, respectively, assume the conditions shown. That is, terminal 8 is disconnected wherein the Y signal is not applied to the circuit and resistor 84 is directly connected via the closed contacts K3 to the base of transistor 88. This operation has the effect of terminating the input signal at terminal 8 such that amplifier A3 which is connected in the integrating mode similar to amplifier A1 discontinues further integration and the output signal Y*t* remains substantially constant. This signal is then applied via resistor 84 and closed contacts K3 to the base of transistor 88. Thus, the signal Y*t* is now injected into amplifier A4 and stored thereby. Moreover, the stored signal Y*t* is the instantaneous value thereof at the time T1 at which the signal Z*t* is equal to the input signal —X.

The differentiating signal applied to the base of transistor 63 has a time duration of approximately 1.0 milliseconds. When the pulse terminates, transistor 63 returns to the conductive condition, and causes current flow in coil 64 of relay K3. When relay K3 is reenergized, contacts K3 associated with input terminal 8 close thereby connecting the Y signal to amplifier A3. Concurrently, contacts K3 associated with the base of transistor 88 are opened wherein further inputs to amplifier A4 are prohibited. Thus, capacitor 99 has now been charged by amplifier A4 such that the signal previously applied from amplifier A3 is now stored in this "sample and hold memory amplifier." After *t*1 and the switching of transistor 63, amplifiers A1 and A3 continue to act as integrators. However, as will be noted hereinafter, the output of amplifier A3 is disconnected from the circuit and is, effectively meaningless. However, the output of amplifier A1 is connected to Zener diode 45. When the output signal Z*t* reaches a predetermined level, which is a function of the characteristics of Zener diode 45, the Zener diode breaks down and conducts reverse current. This signal is applied to the gate terminal of SCS 49 as noted supra.

When the positive signal is applied to the gate terminal of SCS 49, the operation noted supra occurs. That is, SCS 49 fires and provides a negative-going signal which is differentiated and supplied to the base of transistor 52. Transistor 52 is disabled and coil 54 of relay K1 is deenergized. When relay K1 is deenergized, the contacts K1 connected in parallel with the capacitors 33 and 81, respectively, are closed, as shown. This contact closure has the effect of shorting the respective capacitors and discharging same. In addition, the amplifiers are also shorted and returned to the initial condition such that a new ramp signal can be generated.

As noted, relay K1 is deenergized for approximately 3 milliseconds whereby any transients in the discharge of capacitor 33 or in contact bounce, or the like can be thoroughly dissipated prior to the initiation of the new ramp signal. Moreover, it is now seen that the operation of amplifier A3 subsequent to the switching of relay K3 is relatively unimportant. While the trigger signal need not be critical, it must fall between the saturation voltage of amplifier A1 and the maximum signal supplied at input terminal 7. That is, the trigger voltage must be less than the saturation voltage otherwise the trigger voltage would not be obtainable and it must be greater than the input voltage at terminal 7 otherwise this input signal could spuriously trigger the circuit.

Another feature included in the circuit is the time constant of the integrating amplifiers. Thus, it has been determined that a time constant of approximately 50 milliseconds as determined by capacitor 33 and the combined resistance of resistors 21 and 22 produces such an RC time constant. This time constant is not limitative of the invention and is merely illustrative. Such a time constant is chosen inasmuch as most input signals associated with process control applications would be evaluated within such a time duration. Moreover, it is assumed that in most process control applications, the evaluated signals would remain substantially constant within this relatively short time period. In the event that the input signals are varying rapidly relative to the time period, the integration signal would be a function of the average of the input signals supplied thereto.

Figure 3:
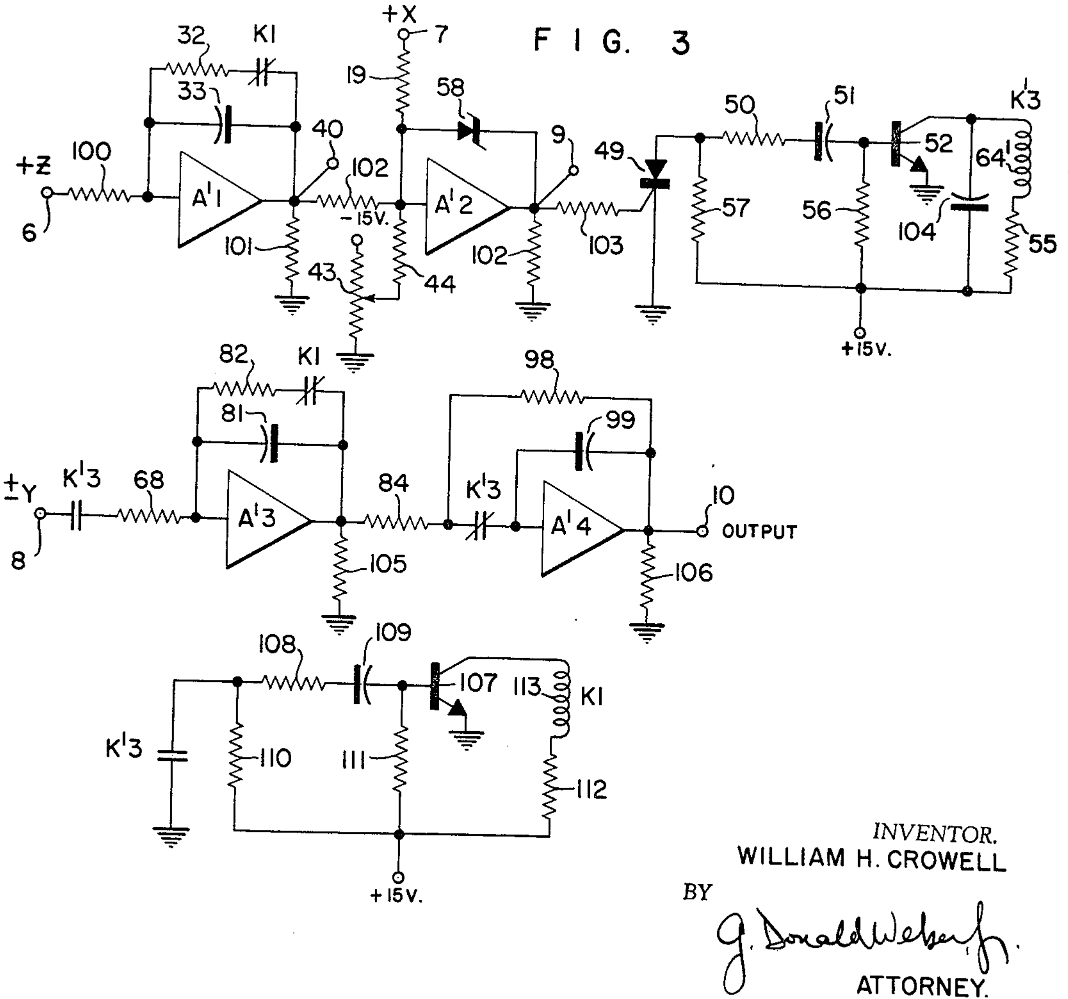
FIGURE 3 is a schematic diagram of a second embodiment of the invention.

Referring now to FIGURE 3, there is shown a schematic diagram of a second embodiment of the invention. In this embodiment, components which are similar to those shown in FIGURE 2 bear the same reference numeral. A detailed description of the circuit shown in FIGURE 3 is not deemed necessary inasmuch as the operation is substantially similar. Thus, amplifiers A'1 and A'3 include the amplifier A1 and A3, respectively, along with the associated control circuitry and function as integrators. The parallel capacitor and relay contacts are identical. In addition, integrator A'1 is meant to include the function of amplifier A5 shown in FIGURE 2. Amplifier A'2 operates as a voltage comparator while amplifier A'4 operates as a "sample and hold amplifier."

However, in FIGURE 3, it is noted that the SCS 49 is connected to the output of comparator A'2. Thus, when comparator A'2 produces a signal, SCS 49 is triggered. When SCS 49 is triggered, transistor 52 is rendered nonconductive and coil 64' of relay K3' is deenergized. When coil 64' is deenergized, relay K3' is deenergized. When K3' is deenergized, the input signal Y is disconnected from amplifier A'3 and the output signal at A'3 is applied to the input of amplifier A'4. Thus, when a comparison is detected at amplifier A'2, a transfer of information from amplifier A'3 to amplifier A'4 occurs as before.

In addition, relay contacts K3' associated with transistor 107 opens when K3' is deenergized wherein a positive signal is supplied at the base of transistor 107. That is, while K3' is energized by conduction at transistor 52, the contacts K3' related to transistor 107 are closed. A small positive signal, for example +0.6 volt is applied to transistor 107 causing conduction thereof. When relay K3' is deenergized, contacts K'3 open and the leading edge of the differentiated positive signal is applied to transistor 107. This produces no net effect. However, the trailing edge of the positive signal, when differentiated, produces a negative signal at transistor 107. Transistor 107 is, therefore, rendered nonconductive and coil 113 is deenergized. When coil 113 of relay K1 is deenergized the contacts of relay K1 are closed thereby shorting the respective capacitors and placing the circuit in the initial condition, ready to begin a new ramp signal. This circuit has the advantage of faster operation than the circuit shown in FIGURE 2 inasmuch as a separate trigger voltage level need not be attained in order to reset the network for further operations.

Thus, two embodiments of the invention are shown. In one embodiment, separate comparison and trigger signals are generated (1) to effect a transfer of information from an integrating amplifier to a storage amplifier and (2) to reset the circuit for further operations. In the second embodiment, a single comparison signal is generated to effect the transfer of information and to reset the system. The operation of the two embodiments is substantially similar in all other respects.

It is appreciated that those skilled in the art will be able to develop modifications of the circuit shown. However, any modifications to the circuits which fall within the inventive precepts embodied in the description hereinabove, are meant to be included therein. The scope of the invention is to be defined by the appended claims.

The embodiments of the invention in which an exclusive property or privilege is claimed are defined as follows:

1. In combination, a plurality of input means, first integrator means for receiving signals from a first one of said input means and providing a ramp output signal in accordance with signals from said first input means, second integrator means for receiving signals from a second one of said input means and providing a ramp output signal in accordance with signals from said second input means, comparator means for receiving signals from a third one of said input means and said ramp output signal from said first integrator means, memory means for selectively receiving said ramp output signals from said second integrator means, compensation means connected to supply an input signal to said comparator means, said comparator means operating to provide a predetermined output signal when the signal from said third one of said input means bears a predetermined relationship to the algebraic sum of said ramp output signal from said first integrator means, and to the signal from said compensating means, thereby establishing an increment of time directly proportional to the quotient of said signals from said third one of said input means and from said first one of said input means, control means selectively responsive to said predetermined output signal of said comparator means to connect said memory means to receive said ramp output signals from said second integrator means, and means responsive to the output of said first integrator means to restore the operation of said first and second integrator means to an initial condition and for initiating the generation of new ramp output signals.

2. The combination recited in claim 1 wherein said compensation means includes amplifier means connected to receive signals from said first input means.

3. The combination recited in claim 2 including calibration means, said calibration means being operative to disconnect said first and second integrator means from said first and second ones of said input means, respectively, and wherein said compensation means includes adjustment means substantially to eliminate undesired integration by said first and second integrator means in the absence of input signals from said first and second input means, respectively.

4. The combination recited in claim 2 wherein said amplifier means has variable gain and the maximum thereof is less than unity, said amplifier means providing an inverting function.

5. The combination recited in claim 1 wherein said compensation means includes a variable voltage source.

6. The combination recited in claim 5 wherein said third input signal is added to the signals which are summed and the algebraic total is applied to said input of said comparator means.

7. The combination recited in claim 1 wherein said first integrator means and said compensation means provide signals which are summed and applied to an input of said comparator means.

8. The combination recited in claim 1 including means selectively connecting the output of said memory means to the input of said first integrator means.

9. The combination recited in claim 8 wherein said control means simultaneously decouples each of said integrator means from the associated input means concurrently with the connection of said memory means and said second integrator means.

10. The combination recited in claim 1 wherein said control means during the time of such selective responsive to the said predetermined output of said comparator means is operative to disconnect said second integrator means from said second one of said input means.

References Cited

UNITED STATES PATENTS

| | | | |
|---|---|---|---|
| 2,879,002 | 3/1959 | Longerich | 235—193.5 X |
| 3,043,516 | 7/1962 | Abbott et al. | 235—193.5 X |
| 3,119,928 | 1/1964 | Skramstad | 235—183 X |
| 3,231,724 | 1/1966 | Andrews | 235—183 X |

MALCOLM A. MORRISON, Primary Examiner

JOSEPH F. RUGGIERO, Assistant Examiner

U.S. Cl. X.R.

235—183, 193.5, 195, 196; 307—229